United States Patent
Jing et al.

(10) Patent No.: US 7,298,847 B2
(45) Date of Patent: Nov. 20, 2007

(54) SECURE KEY DISTRIBUTION PROTOCOL IN AAA FOR MOBILE IP

(75) Inventors: Dongfeng Jing, Beijing (CN); Charles E. Perkins, Saratoga, CA (US)

(73) Assignee: Nokia Inc., Irving, TX (US)

( * ) Notice: Subject to any disclaimer, the term of this patent is extended or adjusted under 35 U.S.C. 154(b) by 916 days.

(21) Appl. No.: 10/072,663

(22) Filed: Feb. 7, 2002

(65) Prior Publication Data

US 2003/0147537 A1    Aug. 7, 2003

(51) Int. Cl.
- H04K 1/00 (2006.01)
- H04L 9/08 (2006.01)
- H04L 9/14 (2006.01)

(52) U.S. Cl. .............. 380/247; 380/248; 380/278; 380/270; 380/279

(58) Field of Classification Search ........... 455/411, 455/433; 709/217; 380/270, 248, 278, 279
See application file for complete search history.

(56) References Cited

U.S. PATENT DOCUMENTS

| | | | |
|---|---|---|---|
| 6,785,823 B1 * | 8/2004 | Abrol et al. | 726/7 |
| 6,915,345 B1 * | 7/2005 | Tummala et al. | 709/225 |
| 6,922,404 B1 * | 7/2005 | Narayanan et al. | 370/338 |
| 6,948,074 B1 * | 9/2005 | Borella et al. | 713/168 |
| 7,042,879 B2 * | 5/2006 | Eschbach et al. | 370/392 |
| 7,080,259 B1 * | 7/2006 | Nakanishi et al. | 713/193 |
| 2001/0016492 A1 * | 8/2001 | Igarashi et al. | 455/433 |
| 2002/0062385 A1 * | 5/2002 | Dowling | 709/230 |
| 2002/0118674 A1 * | 8/2002 | Faccin et al. | 370/352 |

FOREIGN PATENT DOCUMENTS

| WO | WO200126322 | * | 4/2001 |
|---|---|---|---|

OTHER PUBLICATIONS

Oppliger, et al., "Distributed Registration and Key Distribution (DiRK)," May 1996, "Information Systems Security: Facing the Information Society of the 21st Century," Chapman and Hall, Ltd., pp. 199-208.*

Charles E. Perkins, "Mobile IP Joins Forces with AAA", *IEEE Personal Communications*, Aug. 2000, pp. 59-61.

Charles E. Perkins et al., "Mobility Support in Ipv6", *IETF RFC2002*, Oct. 1996, pp. 1-11.

Charles E. Perkins et al., "AAA Registration Keys for Mobile IP", *draft-ietfmobileip-aaa-key-01.txt* Jan. 2000, pp. 1-10.

(Continued)

Primary Examiner—Kambiz Zand
Assistant Examiner—William S Powers
(74) Attorney, Agent, or Firm—Brake Hughes Bellermann LLP

(57) ABSTRACT

A security key distribution and authentication protocol in AAA for Mobile IP has been described. In order to guarantee the secure protocol, messages between the MN, FA, AAAF, AAAH, and HA are encrypted and signed using public/private keys. IPSEC or PKI infrastructure is not required to support the AAA secure key distribution. This protocol enhances the security, flexible, scalability of AAA, and aids in protecting the Diffie-Hellman algorithm from man-in-the-middle attacks. Through this protocol, it is easy to set up a secure registration path in AAA for Mobile IP. This secure registration path provides a secretive and secure key distribution function for AAA.

20 Claims, 5 Drawing Sheets

OTHER PUBLICATIONS

Charles E. Perkins et al., "Mobile IP Challenge/Response Extensions", *draft-ietf-mobileip-challenge-01.txt*, Feb. 1999, pp. 18.

Whitfield Diffie et al. "New Directions in Cryptography", *IEEE Transactions on Information Theory*, V.IT, Jun. 1976, pp. 2940 (644-654).

D. Harkins et al., "The Internet Key Exchange", *FRC2409*, Nov. 1998, pp. 1-41.

P. Calhoun et al., "DIAMETER Base Protocol", *draftcalhoun-diameter-17.txt, IETF work in progress*, Sep. 2000, pp. 1-44.

P. Calhoun et al., "DIAMETER Mobile IP Extensions", *draft-calhoun-diameter-mobileip-11.txt, IETF work in progress*, Sep. 2000, pp. 1-28.

S. Glass et al., "Mobile IP Authentication, Authorization and Accounting Requirements", *draft-ietf-mobileip-aaereqs-04.txt, IETF work in progress*, Jun. 2000, pp. 1-25.

P. Calhoun et al., "Mobile IP Network Address Identifier Extension",*RFC 2794*, Mar. 2000, 1-7.

P. Calhoun et al., "DIAMETER Strong Security Extensions", *draft-calhoun-diameter-strong-crypto-05.txt, IETF work in Progress*, Sep. 2000, pp. 1-12.

P.-C. Cheng "An Architecture for the Internet Key Exchange Protocol", *IBM Sysems Journal*, vol. 40, No. 3, pp. 721-746, 2001.

\* cited by examiner

SECURE KEY DISTRIBUTION PROTOCOL IN AAA FOR MOBILE IP

FIELD OF THE INVENTION

The present invention relates to IP networks, and more particularly to a secure key distribution protocol in AAA for Mobile IP networks.

BACKGROUND OF THE INVENTION

Mobile IP enables a mobile node to move freely from one point of connection to another. During the movement of the mobile node from one connection point to another there should be no disruption of the TCP end-to-end connectivity. In order to extend Mobile IP for use by cellular telephone companies and check the mobile node's identity in the absence of a preconfigured security association with a foreign authority, an authentication, authorization, and accounting ("AAA") mechanism may be used.

AAA may be used to provide the identity verification of a mobile node ("MN") when mobile node is connected to the point of the agent on the foreign domain (foreign agent) by the requirement a security association existed between mobile node and its home domain AAA server. When the mobile node shares a security association with its home AAA server, it is possible to use that security association to create derivative security associations between the mobile node and its home agent, and again between the mobile node and the foreign agent.

AAA as is exists today, however, may be subject to hacking. For example, an AAA protocol may be subject to a man-in-the-middle attack or a replay attack. What is needed is a way to guard against a man-in-the-middle attack, or some other fraud, without unduly complicating an AAA protocol. It is with respect to these considerations and others that the present invention has been made.

SUMMARY OF THE INVENTION

The present invention is directed at addressing the above-mentioned shortcomings, disadvantages and problems, and will be understood by reading and studying the following specification.

According to an aspect of the invention, a protocol is directed at providing secure key distribution, including authentication and key distribution and exchange among foreign authority AAA servers, home authority AAA servers, foreign agents, home agents, and mobile nodes.

According to one aspect of the invention, a security association is established between a foreign AAA server (AAAF) and a home AAA server (AAAH). Once the security association is established, information may be securely passed between the AAAF and AAAH. This information may include authentication, authorization, and accounting rules relating to the mobile node.

According to another aspect of the invention, a security association may be set up directly between a mobile node and a foreign AAA server. Once the security association is established, information may be securely passed between the AAAF and the MN.

According to yet another aspect of the invention, the protocol helps to prevent attacks, such as a man-in-the-middle attack and a replay attack.

According to still yet another aspect of the invention, IP Security Protocol (IPSEC) or Public Key Infrastructure (PKI) is not required to support the AAA secure key distribution. The protocol enhances the security, flexible, and scalability of AAA. Through this protocol, a secure registration path in AAA for Mobile IP may be established. This secure registration path provides a secretive and secure key distribution function for AAA.

DETAILED DESCRIPTION OF THE PREFERRED EMBODIMENT

Figure 1:
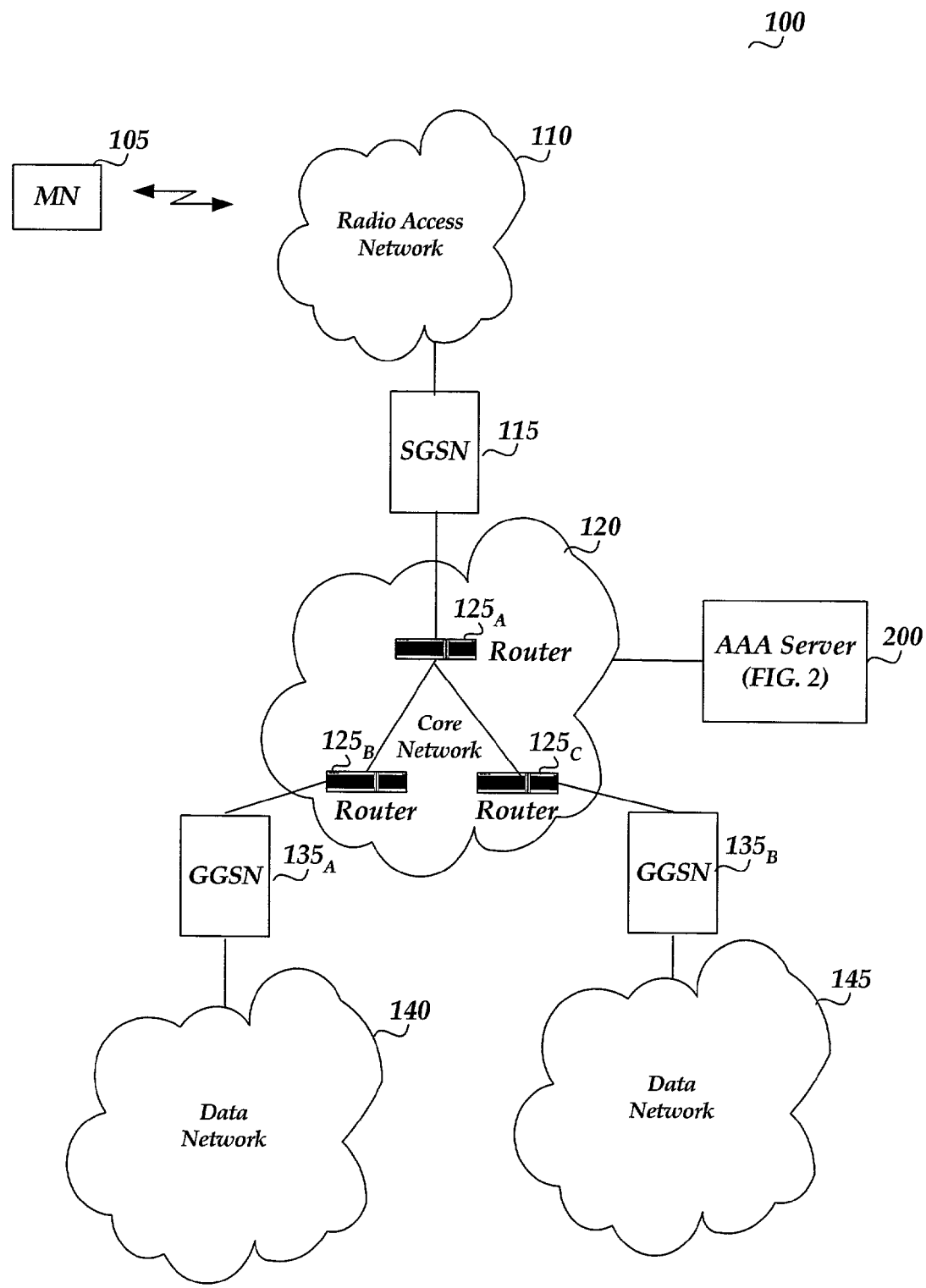
FIG. 1 illustrates an exemplary mobile IP network in which the invention may operate.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "node" refers to a network element, such as a router. The term support node refers to both "GGSN" and "SGSN" nodes. The term "NAI" refers to a network access identifier that uniquely identifies a mobile node. The term "user" refers to any person or customer such as a business or organization that employs a mobile node to communicate or access resources over a mobile network. The term "operator" refers to any technician or organization that maintains or services an IP based network. The term "identifier" includes any NAI, Mobile Station Integrated Services Digital Network Number (MSISDN), IP address, or any other information that relates to the location or identity of the mobile node.

The term "AAA" refers to authentication, authorization, and accounting. The term "AAAH" refers to a home domain AAA server for a mobile node. The term "AAAF" refers to a foreign domain AAA server relative to a mobile node. The term "HA" refers to a home agent. The term "FA" refers to a foreign agent. The term "home agent" refers to a node, such as a router, on the home network which serves as the point of communications with the mobile node. The term "foreign agent" refers to a node, such as a router, on the mobile node's point of attachment when it travels to a foreign network. The term "MN" refers to a mobile node.

Referring to the drawings, like numbers indicate like parts throughout the views. Additionally, a reference to the singular includes a reference to the plural unless otherwise stated or is inconsistent with the disclosure herein.

Illustrative Operating Environment

With reference to FIG. 1, an exemplary mobile IP network in which the invention may operate is illustrated. As shown in the figure, mobile IP network 100 includes mobile node (MN) 105, radio access network 110, Serving GPRS Support Node (SGSN) 115, core network 120, routers $125_{A-C}$, AAA server 200, General Packet Radio Service Nodes (GGSNs) 135 data network 140, and data network 145.

The connections and operation for mobile IP network 100 will now be described. MN 105 is coupled to radio access network 110. Generally, MN 105 may include any device capable of connecting to a wireless network such as radio access network 110. Such devices include cellular telephones, smart phones, pagers, radio frequency (RF) devices, infrared (IR) devices, integrated devices combining one or more of the preceding devices, and the like. MN 105 may also include other devices that have a wireless interface such as Personal Digital Assistants (PDAs), handheld computers, personal computers, multiprocessor systems, microprocessor-based or programmable consumer electronics, network PCs, wearable computers, and the like.

Radio access network 110 transports information to and from devices capable of wireless communication, such as MN 105. Radio access network 110 may include both wireless and wired components. For example, radio access network 110 may include a cellular tower that is linked to a wired telephone network. Typically, the cellular tower carries communication to and from cell phones, pagers, and other wireless devices, and the wired telephone network carries communication to regular phones, long-distance communication links, and the like.

Some nodes may be GPRS nodes. For example, SGSN 115 may send and receive data from mobile stations, such as MS 105, over radio access network 110. SGSN 115 also maintains location information relating to MN 105. SGSN 115 communicates between MN 105 and GGSNs $135_{A-B}$ through core network 120.

Core network 120 is an IP packet based backbone network that includes routers, such as routers $125_{A-C}$, to connect the support nodes in the network. Some of the routers may act as a HA or a FA for a MN. Generally, an agent (HA or FA) communicates with AAA server to maintain a secure connection with the mobile node. Routers are intermediary devices on a communications network that expedite message delivery. On a single network linking many computers through a mesh of possible connections, a router receives transmitted messages and forwards them to their correct destinations over available routes. On an interconnected set of LANs, including those based on differing architectures and protocols, a router acts as a link between LANs, enabling messages to be sent from one to another. Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links.

GGSNs $135_{A-B}$ are coupled to core network 120 through routers $125_{A-C}$ and act as wireless gateways to data networks, such as network 140 and network 145. Networks 140 and 145 may be the public Internet or a private data network. GGSNs $135_{A-B}$ allow MN 105 to access network 140 and network 145.

AAA server 200 is coupled to core network 120 through communication mediums. AAA server 200 may be programmed by an operator to contain the authentication, authorization, and accounting rules associated with the operator's network. AAA server 200 may be programmed differently under different operator's networks. AAA server 200 should be programmed such that is can communicate with foreign AAA servers (not shown).

Utilizing an AAA server helps to enforce authentication, authorization, and accounting rules to help ensure end-to-end quality of service (QoS) for users. Operators have the flexibility to provide different AAA rules. For example, conversational traffic may be mapped into either the Expedited Forwarding (EF) class or Assured Forwarding (AF) class at the core network. The operator may employ a different charging structure for each class. Also, AAA rules may be established for between a foreign authority and a home authority. An exemplary AAA server is described in more detail in conjunction with FIG. 2.

Furthermore, computers, and other related electronic devices may be connected to network 140 and network 145. The public Internet itself may be formed from a vast number of such interconnected networks, computers, and routers. Mobile IP network 100 may include many more components than those shown in FIG. 1. However, the components shown are sufficient to disclose an illustrative embodiment for practicing the present invention.

The media used to transmit information in the communication links as described above illustrates one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Figure 2:
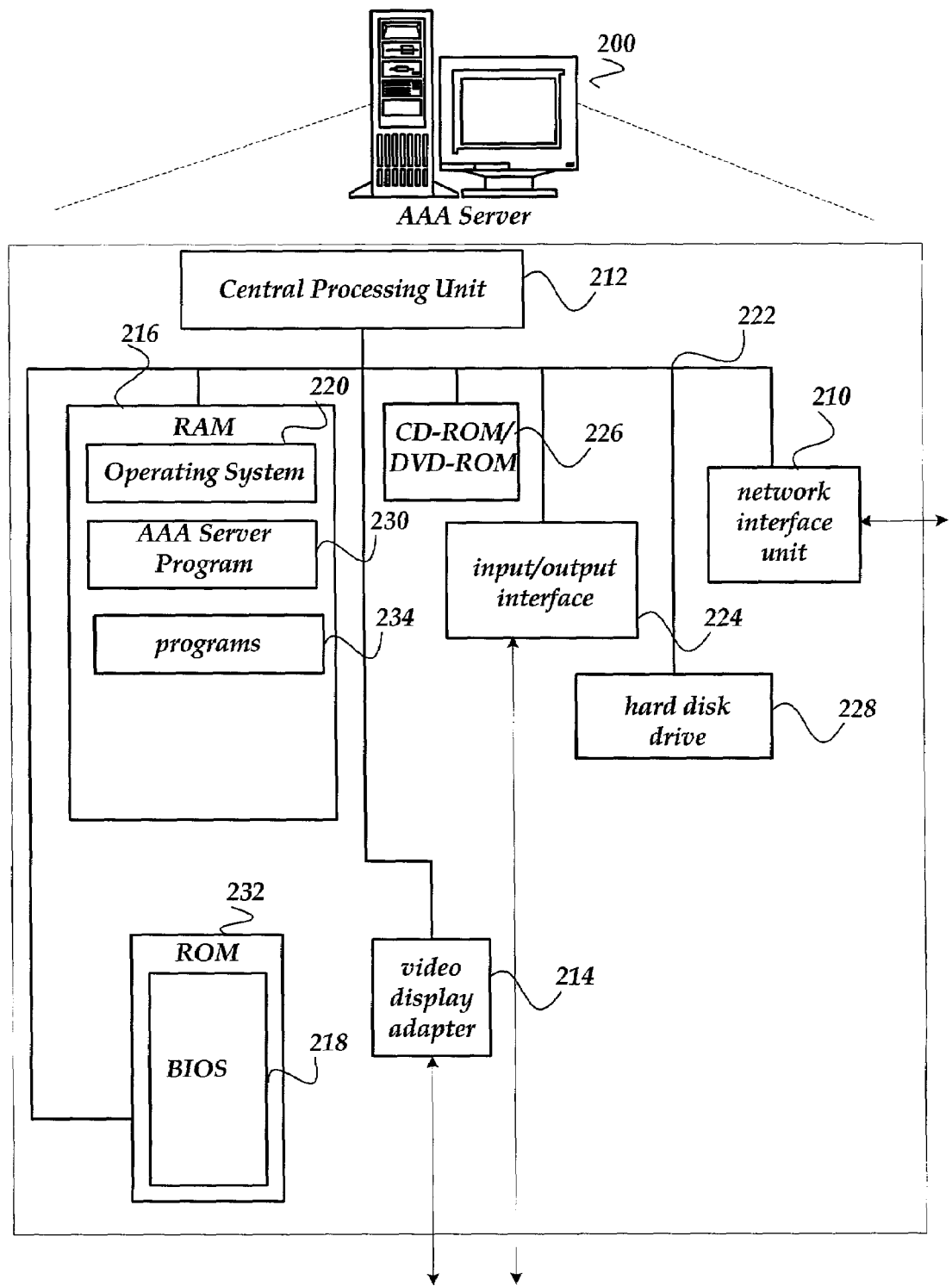
FIG. 2 is a schematic diagram that shows an exemplary AAA server that is operative to provide authentication, authorization, and accounting rules.

FIG. 2 is a schematic diagram that shows an exemplary AAA server that is operative to provide authentication, authorization, and accounting rules. Accordingly, AAA server 200 may receive and transmit data relating to the AAA rules. For instance, AAA server 200 may transmit AAA rules and receive data from the nodes on the mobile IP network.

AAA server 200 may include many more components than those shown in FIG. 2. However, the components shown are sufficient to disclose an illustrative embodiment for practicing the present invention. As shown in FIG. 2, AAA server 200 is connected to core network 120, or other communications network, via network interface unit 210. Network interface unit 210 includes the necessary circuitry for connecting AAA server 200 to core network 120, and is constructed for use with various communication protocols including the Common Open Policy Services (COPS) protocol that runs on top of the Transmission Control Protocol (TCP). Other communications protocols may be used, including, for example, User Datagram Protocols (UDP). Typically, network interface unit 210 is a card contained within AAA server 200.

AAA server 200 also includes processing unit 212, video display adapter 214, and a mass memory, all connected via bus 222. The mass memory generally includes RAM 216, ROM 232, and may include one or more permanent mass storage devices, such as hard disk drive 228, a tape drive, CD-ROM/DVD-ROM drive 226, and/or a floppy disk drive. The mass memory stores operating system 220 for controlling the operation of policy server 200. This component may comprise a general purpose server operating system 220 as is known to those of ordinary skill in the art, such as UNIX, LINUX™, or Microsoft WINDOWS NT®. Basic input/output system ("BIOS") 218 is also provided for controlling the low-level operation of AAA server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for AAA server program 230 (See Figures and Related discussion below), and programs 234. AAA server program 230 includes computer executable instructions which, when executed by AAA server computer 200, maintain authentication, authorization, and accounting rules. AAA server 200 may include a JAVA virtual machine, an HTTP handler application for receiving and handing HTTP requests, JAVA applets for transmission to a WWW browser executing on a client computer, an IPsec handler, a Transport Layer Security (TLS) handler and an HTTPS handler application, and a secure protocol AAA handler, for handling secure connections.

AAA server 200 also comprises input/output interface 224 for communicating with external devices, such as a mouse, keyboard, scanner, or other input devices not shown in FIG. 2. Likewise, AAA server 200 may further comprise additional mass storage facilities such as CD-ROM/DVD-ROM drive 226 and hard disk drive 228. Hard disk drive 228 is utilized by AAA server 200 to store, among other things, application programs, databases, and program data used by AAA server program 230. For example, AAA rules, user databases, relational databases, and the like, may be stored.

Protocol Notations

In order to simplify the description of the secure key distribution protocol, the following notations will be used. The notation "<. . . >" refers to a non-encrypted text message. The notation "$K_{A-B}$" refers to the key used to encrypt the message transmitted between A and B, where A and B can be selected from a MN (mobile node), HA (home agent), FA (foreign agent), AAAF (foreign AAA), and an AAAH (home AAA). The notation "<-> $K_{A-B}$ refers to the cipher text encrypted by key $K_{A-B}$. The notation "$X_{ID}$" refers to an identification number which is used by X or other partners. For example, $X_{ID}$ may be X's NAI, or IP Address. The notation "$R_x$" refers to a random number which is generated by X. The notation "CH" refers to a challenge generated by a FA. The notation "Ts" refers to a timestamp. The notation "SA" refers to a security association. The notation "n" refers to a random great prime n used in the Diffie-Hellman algorithm. The notation "g" refers to a random great prime g used in the Diffie-Hellman algorithm. The notation "p" refers to the result from $p=g^x$ mod n in the Diffie-Hellman algorithm, where the AAAH chooses a random number x, keeps x secret, and before MN begins to roam, the MN keeps n, g, and p in its memory. The notation "q" refers to the result from $q=g^y$ mod n based on the Diffie-Hellman algorithm, where AAAF can generate a SA between itself and an AAAH for a MN. The notation "$AUTH_{A-B}$" refers to a signature produced by a shared key between A and B. The notation "Reg-Req" refers to a MN Registration Request message. The notation "Reg-Reply" refers to a Registration Reply message sent by a HA.

Secure Key Distribution Protocol for Mobile IP

Figure 3:
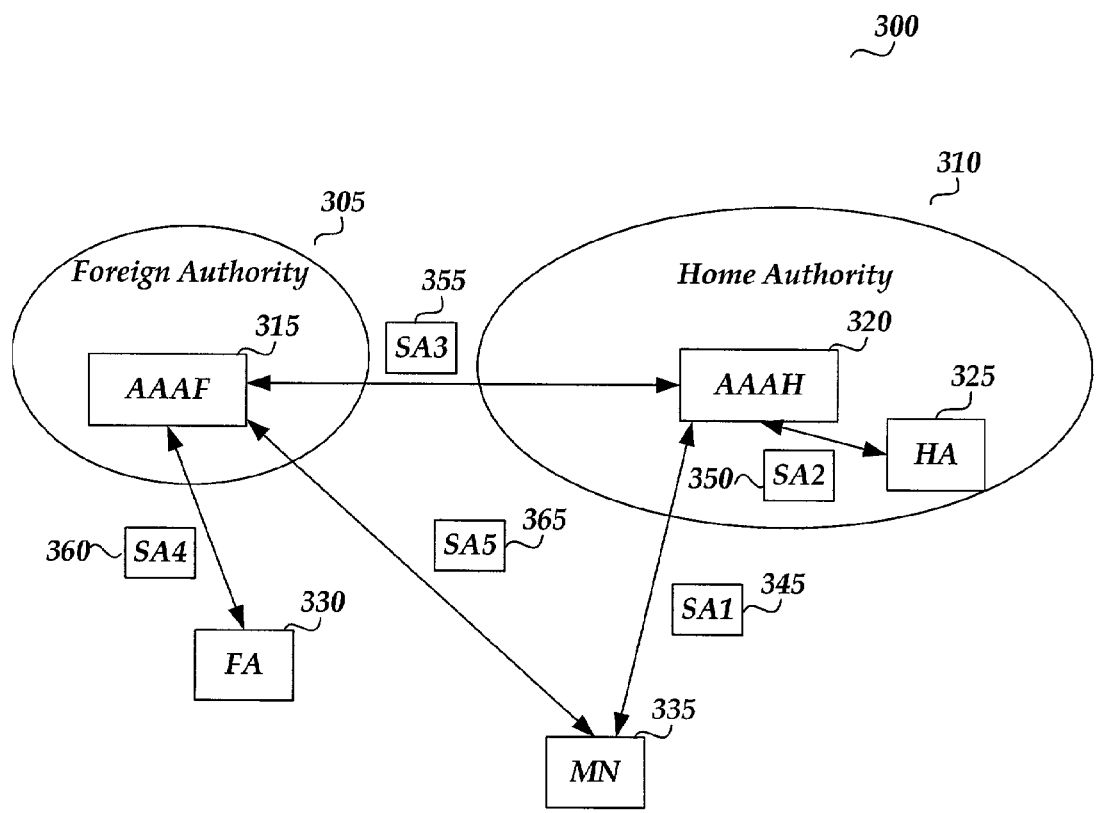
FIG. 3 illustrates a mobile IP/AAA trust model.

FIG. 3 illustrates a mobile IP/AAA trust model, in accordance with aspects of the invention. As shown in the figure, IP/AAA trust model 300 includes foreign authority 305, foreign agent (FA) 330, home authority (310), home agent (HA) 325, mobile node 335, AAAF 315, and AAAH 320.

Secure associations are established between the MN, AAAH, AAAF, HA, and FA nodes to ensure secure communication. SA1 345 is established between AAAH 320 and mobile node 335. SA2 350 is established between HA 325 and AAAH 320. SA3 is established between AAAF 315 and AAAH 320. SA4 is established between AAAF 315 and FA 330. SA5 is established between AAAF 315 and MN 335.

In order to authenticate mobile nodes and convey session keys from AAAH 320 to AAAF 315 a security model, as shown in FIG. 3, may be used. MN 335 maintains a security association, SA1 345, with AAAH 320. SA1 345 is used by the home authority to authenticate the mobile node. In this exemplary figure, MN 335 belongs to home authority, or home domain 310. An authority is able to validate a user's credentials and is used to maintain and establish security relationships with authorities that are external to the mobile node's home network. The authority may be a single node, such as a computer or router, on the network, or the authority may include several nodes that are used to make up the authority. The security association SA3 355 between AAAF 315 and AAAH 320 handles the authentication, authorizations, and possibly the accounting data, between home authority 310 and foreign authority 305. HA 325 maintains a secure association, SA2 350, with AAAH 320. SA5 365 may be established between AAAF 315 and MN 335. Similarly, SA4 360 is established between AAAF 315 and FA 330. SA's within a single domain may be achieved by local management or static configuration. However, SA's between foreign AAA's is more difficult as there may be many hops between the AAA. Additionally, a secure association does not typically exist between AAA's located within different authorities.

Although MN 335 may not connect directly to AAAF 315, sometimes information between them should be passed directly. The direct communication may be for efficiency reasons or security reasons. This is especially true when a mobile node moves between different foreign agents or attendants located in the same AAA domain.

A secure protocol, described below, sets up the SA's between the MN and the foreign authority and the home authority. More specifically, the invention is directed at providing functions of: (1) the real-time establishment of a security association between a home AAA and a foreign AAA, such as SA3 355, and between a mobile node and a foreign AAA, such as SA5 365; (2) an authenticated signature on the Registration Request message coming from the mobile node through the foreign AAA and foreign agent to the home authority; (3) secure end-to-end key distribution and exchange among the mobile node, the home AAA and the foreign AAA; (4) authentication among the mobile node, the home AAA and the foreign AAA; and (5) protection against hacking the SA's by schemes such as man-in-the-middle attack, and replay attack.

MN 335 keeps in its memory the Diffie-Hellman parameters n, g, p generated by AAAH 320. These parameters may be changed if necessary since a security association always exits between MN 335 and AAAH 320. Although MN 335 knows the n, g, p, parameters, MN 335 does not know the security association between AAAF 315 and AAAH 320.

Before distributing session keys to other partners, AAAH 320 confirms the identity of MN 335 and AAAF 315 by comparing the MN's new care-of-address and the ID of AAAF 315. MN 315's care-of-address is secured by signature $AUTH_{MN-AAAH}$. The ID of AAAF 315, $AAAF_{ID}$ is secured by the signature $AUTH_{AAAF-AAAH}$. Securing the care-of-address and ID helps to prevent an attack that may intercept the information. If there is an attempted attack, such as a man-in-the-middle attack, the system will recognize that an attack has occurred. AAAF 315 will not recognize the signature $AUTH_{AAAH-AAAF}$ and therefore reject the authentication and end the registration session. AAAF 315 also checks the ID's, $HA_{ID}$ and $AAAH_{ID}$, in the reply message with MN 335's NAI to ensure the identity of AAAH 320. When the ID's are not valid, the registration is ended.

AAAH 320 distributes session keys encrypted by different SAs, which protect the authentication results and the information exchange. AAAH 320 generates the key $K_{MN-AAAF}$ that is used by MN 335 and AAAF 315 during the MN registration process, and a new key, $K_{AAAF-AAAH}$ for the communication between AAAH 320 and AAAF 315.

Figure 4:
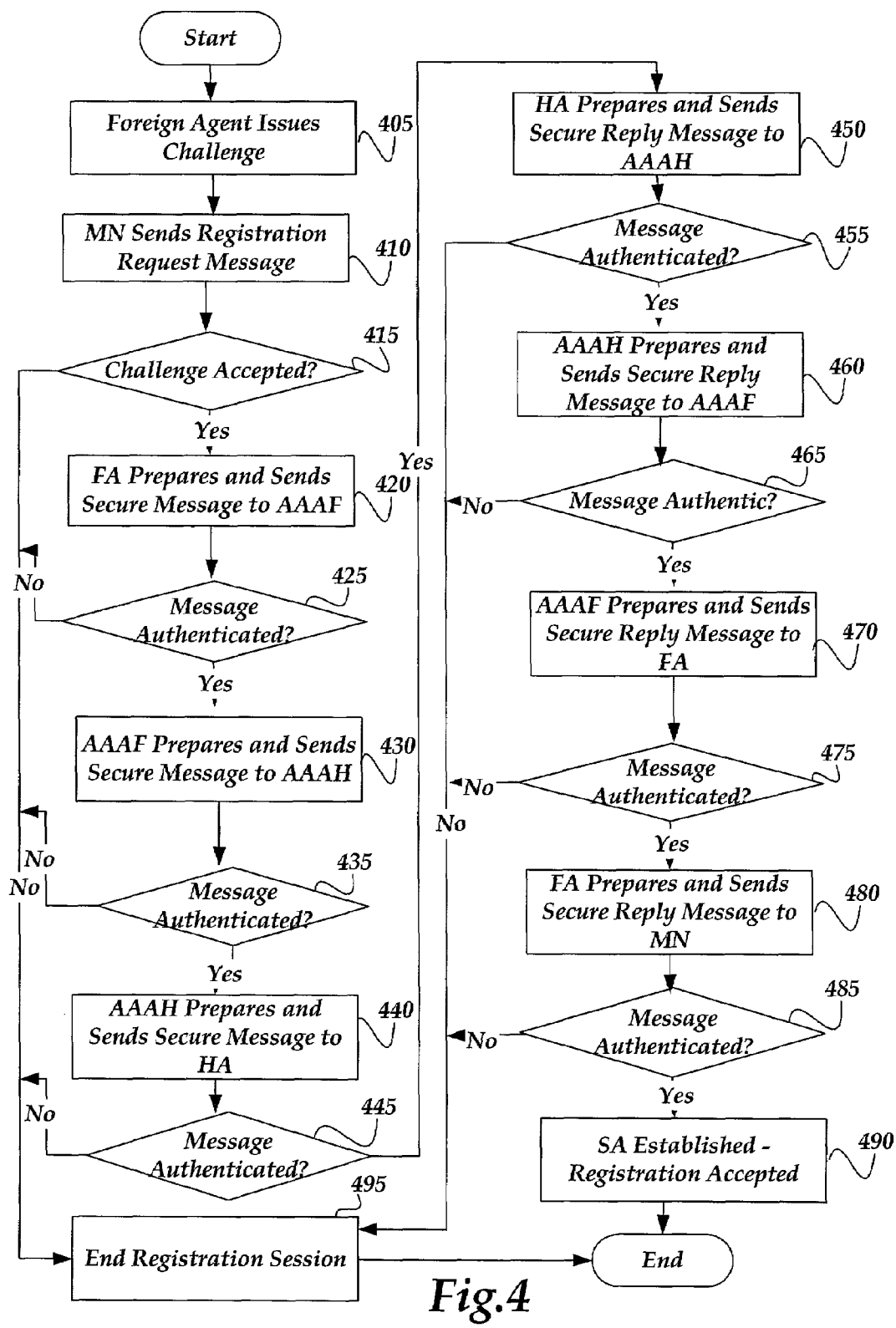
FIG. 4 illustrates a process for a secure protocol procedure.

FIG. 4 illustrates a process for a secure protocol procedure, in accordance with aspects of the invention. After a start block, the logic flows to block 405, at which point a foreign agent issues a challenge. MNs incorporate the challenge in a registration request message. Moving to block 410, the MN sends a registration request message to the FA incorporating the challenge. Transitioning to decision block 415, a decision is made as to whether the challenge is accepted by the FA. A challenge is accepted when the challenge received is the same challenge issued by the FA and has not been used by a MN. A challenge may also not be accepted when the challenge is not the most recent challenge issued by the FA. When the challenge is not accepted, the process moves to block 495 at which point the registration process ends. At this point an error message may be generated. When the challenge is accepted, the process moves to block 420, at which point the FA prepares and sends a secure message to the AAAF associated with the FA. The message includes a unique identifier associated with the FA and is signed using a public/private key pair associated with the AAAF and FA.

Transitioning to decision block 425, a decision is made as to whether the message is authenticated. A message is authenticated when the message is signed using the correct key and contains the identifying information relating to the sender within the message. When the message is not authentic, the process moves to block 495 where the registration process ends and an error message may be generated. When the message is authentic, the process moves to block 430.

At block 430, the AAAF prepares and sends a secure message to the AAAH associated with the MN requesting registration. The AAAF includes a unique identifier, Diffie-Hellman parameters (See FIG. 5 and related discussion), and is signed by AAAF using the key pair relating to the AAAF and AAAH.

Stepping to decision block 435, the AAAH determines if the message is authentic (See discussion relating to block 425). When the message is not authentic, the process moves to block 495 where the registration process ends and an error message may be generated. When the message is authentic, the process moves to block 440.

At block 440, the AAAH prepares and sends a secure message to the HA associated with the MN requesting registration. The AAAH generates session keys for FA, HA and MN that are used for secure communication (See FIG. 5 and related discussion), and is signed by AAAH using the key pair relating to the AAAH and HA.

Stepping to decision block 445, the HA determines if the message is authentic (See discussion relating to block 425). When the message is not authentic, the process moves to block 495 where the registration process ends and an error message may be generated. When the message is authentic, the process moves to block 450.

Moving to block 450, the HA prepares and sends a secure registration reply message to the AAAH. The HA includes a unique identifier (See FIG. 5 and related discussion), and is signed by HA using the key pair relating to the AAAH and HA.

Transitioning to decision block 455, the AAAH determines if the message is authentic (See discussion relating to block 425). When the message is not authentic, the process moves to block 495 where the registration process ends and an error message may be generated. When the message is authentic, the process moves to block 460.

At block 460, the AAAH prepares and sends a secure registration reply message to the AAAF. The AAAH includes a unique identifiers, keys relating to FA, MN, AAAF, and AAAH, and is signed by HA using the key pair relating to the AAAH and AAAF (See FIG. 5 and related discussion).

Transitioning to decision block 465, the AAAF determines if the message is authentic (See discussion relating to block 425). When the message is not authentic, the process moves to block 495 where the registration process ends and an error message may be generated. When the message is authentic, the process moves to block 470.

Stepping to block 470, the AAAF prepares and sends a secure registration reply message to the FA. The AAAF includes a unique identifiers, keys relating to FA, MN, AAAF, and AAAH, and is signed by the AAAF using the key pair relating to the AAAF and FA (See FIG. 5 and related discussion).

Transitioning to decision block 475, the FA determines if the message is authentic (See discussion relating to block 425). When the message is not authentic, the process moves to block 495 where the registration process ends and an error message may be generated. When the message is authentic, the process moves to block 480.

Moving to block 480, the FA prepares and sends a secure registration reply message to the MN. The FA includes a unique identifiers, and keys relating to FA, MN, AAAF, and AAAH, and is signed by the FA (See FIG. 5 and related discussion).

Transitioning to decision block 485, the MN determines if the message is authentic (See discussion relating to block 425). When the message is not authentic, the process moves to block 495 where the registration process ends and an error message may be generated. When the message is authentic, the process moves to block 490.

At block 490, the SA is established and the registration is accepted. The process then moves to an end block and returns to processing other actions.

Figure 5:
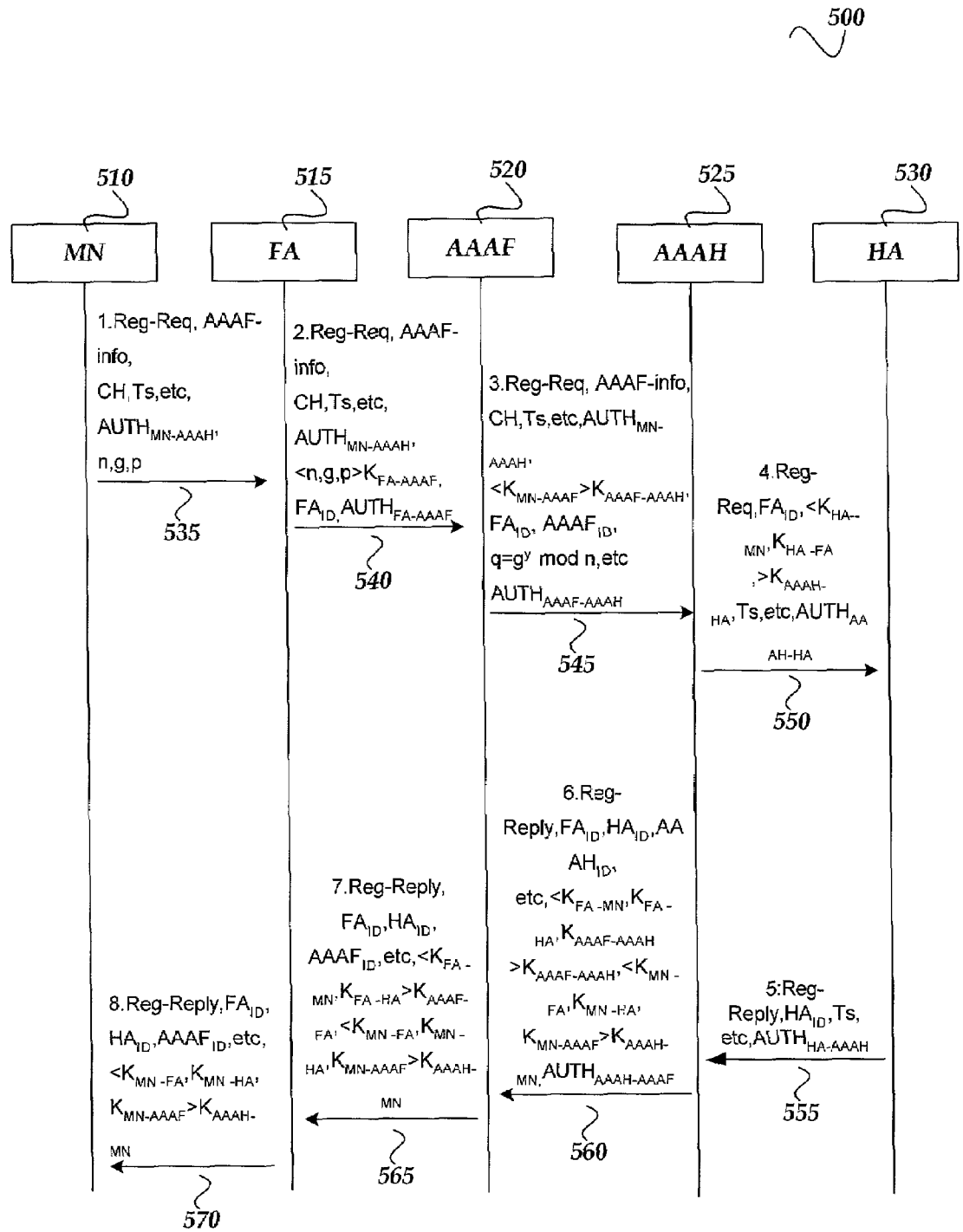
FIG. 5 illustrates a diagram of a protocol procedure, in accordance with aspects of the invention.

FIG. 5 illustrates a diagram of a protocol procedure, in accordance with aspects of the invention. As shown in the figure, protocol procedure 500 includes MN 510, FA 515, AAAF 520, AAAH 525, and HA 530 arranged in the corresponding order as listed.

An exemplary protocol procedure will now be described. Agents within an authority generate a challenge of other information that is used in authenticating a mobile node. According to the present example, FA 515 issues and broadcasts a challenge, or some other information that is used for authenticating mobile node, across the network. According to one embodiment, the broadcast may be made according to the Router Discovery Protocol as proposed by the Internet Engineering Task Force (IETF). The FA changes its generated broadcast challenge (CH) at predetermined times in order to help ensure that fraud does not occur. In response to receiving the challenge, MN 510 generates Reg-Req message 535 and sends the message to FA. Reg-Req message 535 includes the MN's NAI and a time stamp, the challenge issued by FA 515, and the Diffie-Hellman parameters, n, g, p, etc that are used to generate keys and signatures. The Reg-Req message may also include other information as determined by the operator. MN 510 creates a signature for the entire message using its security association between itself and its home AAA server (AAAH). As a result, Reg-Req message 535 is signed using the signature $AUTH_{MN-AAAH}$. Once the message is signed, MN 510 sends message 535 to FA 515 through a wired or wireless medium.

Next, FA 515 receives signed encrypted Reg-Req message 535. FA 515 checks the challenge included in the message is valid by ensuring that the challenge value has not already been used by a MN. By checking that the challenge value was previously unused by an MN, the FA precludes attempting to replay a previous advertisement and authentication. The FA may also make sure that the challenge has been issued within a predetermined time. Checking to make sure that the challenge has been issued recently helps to ensure that the challenge is valid. If the FA can not accept the challenge, or finds some other mistakes in the message, the FA may report the error to the MN and then ends the authentication session with the MN. Otherwise, when the challenge is accepted, and there are no errors in the Reg-Req message, FA 515 adds an identifier to the message and signs the message using its SA with its AAA server, AAAF 520, creating message 540. The identifier may be an NAI, a new random nonce, a Ts, and the like. FA 515 uses its key $K_{FA-AAAF}$ to sign the message such that the signature of the message is $AUTH_{FA-AAAF}$. Once the message is signed, FA 515 transmits signed encrypted message 540 to AAAF 520.

Next, AAAF 520 receives the incoming message from FA 515 and ensures that the message came from FA by checking the signature $AUTH_{FA-AAAF}$. Next, AAAF 520, chooses a secret random number y to calculate $q=g^y$ mod n according to the Diffie-Helman algorithm. The key $K_{AAAF-AAAH}$ is generated based on $g^{yx}$ mod n which is based on p, y relating to the Diffie-Helman algorithm. AAAF 520 then adds some additional factors to the message, such as q and its ID ($AAAF_{ID}$). AAF 520 signs the message using key $K_{AAAF-AAAH}$ and signs the message with signature $AUTH_{AAAF-AAAH}$. Then, AAAF 520 sends message 545 to AAAH 525. The AAAH for the MN is determined by an identifier associated with MN 510, such as MN 510's NAI. AAAF 520 sends the message out to the AAAH based on the MN's identifier, such as the MN's network access identifier (NAI). According to one embodiment of the invention, the AAAF also stores the MN Registration Request session time to prevent a Reply message fail or overtime situation.

Next, AAAH 525 receives message 545 from AAAF 520. AAAH 525 ensures the original message originated from MN 510 by checking signature $AUTH_{MN-AAAH}$. Based on its identifier and q, AAAH 525 calculates the SA ($K_{AAAF-AAAH}$) with AAAF 520 and checks the identity of AAAF 520 through signature $AUTH_{AAAF-AAAH}$. The MN Reg-Req message received by AAAH 525 includes a timestamp or a nonce, which helps to protect the authentication process from a replay attack. When AAAH 525 does not recognize MN 510, an error is generated. When an error is generated, AAAH 525 may send back a message to inform AAAF 520 of the failure.

After confirming the identity of MN 510, AAAH 525 helps the FA, or some other attendant, to directly communicate to HA through a SA. To aid in the SA, AAAH 525 generates session keys for FA, HA, and MN which are distributed in a secure fashion. AAAH 525 encrypts the session keys $K_{HA-FA}$ and $K_{FA-HA}$ by using the SA between AAAH and the home agent for MN 510 ($K_{HA-AAAH}$). AAAH 525 forwards Reg-Req message 550 to HA 520 signed using $AUTH_{AAAH-HA}$.

Message 550 is received by HA 530. HA 530 then registers MN 510's current location, and stores the two session keys received from AAAH 525. HA 530 then generates reply message 555, signs the message using $AUTH_{HA-AAAH}$, and sends reply message 555 to AAAH 525.

AAAH 525 receives message 555 sent by HA 530. After authenticating Reg-Reply message 555, AAAH 525 adds session keys $K_{FA-MN}$, $K_{MN-HA}$, and $K_{MN-AAAF}$ and newly created key $K_{AAAH-AAAF}$ to the message. Keys $K_{FA-MN}$, $K_{FA-HA}$, and $K_{AAAH-AAAF}$ are encrypted using the old key $K_{AAAH-AAAF}$. AAAH 525 also adds keys $K_{MN-FA}$, $K_{MN-HA}$, and $K_{MN-AAAF}$ to the message that are encrypted using key $K_{MN-AAAH}$. AAAH 525 signs message 560 with signature $AUTH_{AAAH-AAAF}$ and sends message 560 to AAAF 520.

Next, AAAF 520 receives message 560 from AAAH 525. AAAF 520 authenticates the message coming from AAAH 525 verifying signature $AUTH_{AAAH-AAAF}$, and by comparing MN 510's NAI, or some other identifier, with HA 530's ID or AAAH 525's ID. AAAF 520 then decrypts and keeps session key $K_{MN-AAAF}$ and new $K_{AAAH-AAAF}$ in its memory. AAAF 520 also encrypts keys $K_{FA-MN}$ and $K_{FA-HA}$ and other MN session keys, along with the reply message, using key $K_{FA-AAAF}$ creating message 565. Finally, AAAF 520 sends message 565 to FA 515.

Next, FA 515 receives message 565 and authenticates the message. When the message is authenticated, FA 515 decrypts the message and retrieves the session keys using HA and MN and keeps them in the memory. FA 515 also generates encrypted message 570 which includes the Reg-Reply, ID's of FA, HA, and AAAF, and the keys $K_{MN-FA}$, $K_{MN-HA}$, $K_{MN-AAAF}$ using key $K_{MN-AAAH}$.

The security key distribution and authentication protocol described has many advantages. Characteristics of Mobile IP, AAA and the Internet are taken into account. In order to guarantee the secure protocol, messages between the MN, FA, AAAF, AAAH, and HA are designed for security. IPSEC or PKI infrastructure is not required to support the AAA secure key distribution. This protocol enhances the security, flexible, scalability of AAA, and aids in protecting the Diffie-Hellman algorithm from man-in-the-middle attacks. Through this protocol, it is easy to set up a secure registration path in AAA for Mobile IP. This secure registration path provides a secretive and secure key distribution function for AAA.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A system for a secure key distribution protocol in AAA for Mobile IP, comprising:
    an MN that is configured to: generate a Reg-Req message that includes Diffie-Hellman parameters that are used to generate session keys and produce signatures; initiate an authentication session by sending the Reg-Req message; receive a Reg-Reply message that includes session keys that may be used to directly communicate with the AAAH, AAAF, HA, and FA nodes while the MN is in a foreign authority, wherein the session keys are encrypted and wherein the session keys include a first at least one key, a second at least one key, and a third at least one key;
    an FA that is configured to: receive the Reg-Req message; ensure that the authentication session is valid; and when valid, sign and send the Reg-Req message; otherwise, end the authentication session; receive, and authenticate the Reg-Reply message, decrypt at least one key of the session keys; sign, and send the Reg-Reply message to the MN;
    an AAAF that is configured to: receive and authenticate the Reg-Req message; generate a first at least one key of the session keys using the Diffie-Hellman algorithm and the Diffie-Heilman parameters; add an identifier relating to the Reg-Req message; sign and send the Reg-Req message; receive, authenticate, sign and send the Reg-Reply message to the FA;
    an AAAH that is configured to: receive and authenticate the Reg-Req message; generate a second at least one key of the session keys; sign and send the Reg-Req message including the second at least one key; receive and authenticate the Reg-Reply message; generate a third at least one key of the session keys; encrypt the session keys; sign and send the Reg-Reply message including the third at least one key to the AAAF and
    an HA that is configured to: receive the Reg-Req message including the second at least one key; prepare a Reg-Reply message in response to the Reg-Req message; and send the Reg-Reply message to the AAAH.

2. The system of claim 1, wherein the Diffie-Hellman parameters include an n, a g, and a p parameter; wherein the parameters are used to generate the session keys and are used in signing the Reg-Req message and the Reg-Reply message.

3. The system of claim 2, wherein the Reg-Req message and the Reg-Reply message include an identifier relating to where the message originated, wherein the identifier is selected from an NAI and a new random nonce.

4. The system of claim 3, wherein the Reg-Req message and the Reg-Reply message are signed using a security association between a sender of the Reg-Req message and the Reg-Reply message and a receiver of the Reg-Req message and the Reg-Reply message.

5. The system of claim 4, wherein the AAAF is further configured to: choose a secret random number y to calculate a parameter $q=g^y \mod n$ according to the Diffie-Hellman algorithm that is used in generating the session keys.

6. The system of claim 4, wherein authenticating the Reg-Req message and the Reg-Reply message further comprises ensuring that the Reg-Req message and the Reg-Reply message came from the sender by checking the signature relating to a security association between the sender and the receiver.

7. The system of claim 6, wherein the AAAF is further configured to determine the AAAH for the MN in response to the identifier associated with the MN.

8. The system of claim 7, wherein the AAAF is further configured to store a time associated with the initiation of the authentication session in order to prevent a Reply message failure.

9. The system of claim 8, wherein the AAAH is further configured to protect the authentication process from a replay attack, and when the AAAH does not recognize the MN, generate an error.

10. The system of claim 9, wherein the AAAH is further configured to help the FA directly communicate to the HA through a security association by generating the session keys for the FA, HA, and MN, and distributing the session keys in a secure fashion.

11. The system of claim 10, wherein distributing the session keys in a secure fashion, further comprises encrypting the session keys.

12. The system of claim 11, wherein the HA is further configured to register a current location of the MN and store the session keys.

13. A method for a secure key distribution protocol in AAA for Mobile IP, comprising:
    establishing secure associations between a MN, an AAAH, an AAAF, a HA, and a FA to help ensure secure communication;
    securing a Reg-Req message and a Reg-Reply message used in establishing the secure associations;
    creating a plurality of session keys by the AAAH and at least another session key by the AAAF; and
    distributing the session keys in a secure manners,
    wherein a first one of the plurality of the session keys is sent by the AAAH via the Reg-Req message to the HA, and wherein a second one of the plurality of the session keys is sent by the AAAH via the Reg-Reply message to the AAAF.

14. The method of claim 13, further comprising using a home authority and a foreign authority to maintain and help establish the secure associations.

15. The method of claim 14, wherein establishing the secure associations between the MN, the AAAH, the AAAF, the HA, and the FA, further comprises:
    establishing a secure association between the MN and the AAAH;
    establishing a secure association between the AAAH and the HA;
    establishing a secure association between the AAAF and the AAAH;
    establishing a secure association between the AAAF and the FA; and
    establishing a secure association between the AAAF and the MN.

16. The method of claim 15, further comprising determining when a signature is an authentic signature based on the secure associations and the session keys.

17. The method of claim 16, wherein establishing the secure associations between the MN, the AAAH, the AAAF, the HA, and the FA to help ensure secure communication, further comprises:
    signing the Reg-Req message and the Reg-Reply message using the session keys; and
    authenticating the received Reg-Req message and the Reg-Reply message.

18. The method of claim 17, wherein creating the session keys further comprises utilizing Diffie-Hellman parameters and the Diffie-Hellman algorithm.

19. The method of claim 18, wherein the Reg-Req message includes an NAI associated with the MN, a timestamp, a challenge issued by the FA, and the Diffie-Hellman parameters.

20. The method of claim 19, wherein the Reg-Reply message includes an identifier and the session keys.

* * * * *